(12) United States Patent
Sanchez et al.

(10) Patent No.: US 10,594,668 B1
(45) Date of Patent: Mar. 17, 2020

(54) CRYPTO CLOUDLETS

(71) Applicant: Thales eSecurity, Inc., Plantation, FL (US)

(72) Inventors: Enrique Sanchez, Hallandale Beach, FL (US); Bernardo Arainty, Boca Raton, FL (US); John Perret, Fort Lauderdale, FL (US); Tomas Arredondo, Boca Raton, FL (US); Pedro Valladares, Delray Beach, FL (US); Guillermo Cordon, Miami, FL (US); Sergio Barcala, Coconut Creek, FL (US); Marc Boillot, Plantation, FL (US)

(73) Assignee: Thales eSecurity, Inc., Plantation, FL (US)

( * ) Notice: Subject to any disclaimer, the term of this patent is extended or adjusted under 35 U.S.C. 154(b) by 0 days.

(21) Appl. No.: 15/429,937

(22) Filed: Feb. 10, 2017

Related U.S. Application Data (60) Provisional application No. 62/428,789, filed on Dec. 1, 2016.

(51) Int. Cl.
*H04L 29/06* (2006.01)
*H04L 9/08* (2006.01)

(52) U.S. Cl.
CPC .......... *H04L 63/045* (2013.01); *H04L 9/0861* (2013.01); *H04L 9/0894* (2013.01); *H04L 63/083* (2013.01); *H04L 63/166* (2013.01)

(58) Field of Classification Search
CPC ... H04L 63/045; H04L 63/166; H04L 63/083; H04L 9/0861; H04L 9/0894
See application file for complete search history.

(56) References Cited

U.S. PATENT DOCUMENTS

| | | |
|---|---|---|
| 3,798,359 A | 3/1974 | Feistel |
| 4,200,770 A | 4/1980 | Hellman et al. |
| 4,218,582 A | 9/1980 | Hellman et al. |
| 7,181,017 B1 | 11/2007 | Nagel et al. |
| 7,587,368 B2 | 9/2009 | Felsher |
| 7,869,591 B1 | 1/2011 | Nagel et al. |
| 8,316,237 B1 | 11/2012 | Felsher et al. |
| 8,498,941 B2 | 7/2013 | Felsher |
| 8,565,435 B2 | 10/2013 | Gentry et al. |

(Continued)

FOREIGN PATENT DOCUMENTS

| | | |
|---|---|---|
| WO | WO 2013074041 | 11/2012 |
| WO | WO2017001870 A1 | 1/2017 |

*Primary Examiner* — Christopher C Harris
(74) *Attorney, Agent, or Firm* — Sage Patent Group; Marc Boillot (57) ABSTRACT

In one embodiment, a crypto cloudlet is provided that includes a security wrapper to a virtual machine to guarantee secure Input/Output exchange between a client and one or more cryptographic adaptive services powered by a set of virtual CPUs through a single well defined channel, an adaptive service running in the virtual machine that identifies hardware resources necessary to satisfy a cryptographic demand or request, and an Ethernet interface communicatively coupled to the security wrapper providing network channel services for exchange of cryptographic data and commands. The security wrapper presents to the adaptive services the hardware accelerators exposed by the virtual machine. Other embodiments are disclosed.

17 Claims, 8 Drawing Sheets

(56) References Cited

U.S. PATENT DOCUMENTS

| | | |
|---|---|---|
| 8,566,247 B1 | 10/2013 | Nagel et al. |
| 8,904,181 B1 | 11/2014 | Felsher et al. |
| 9,083,510 B1 | 7/2015 | Lakshman et al. |
| 9,306,946 B1 | 4/2016 | Osburn |
| 9,503,433 B2 | 11/2016 | Nayshtut et al. |
| 9,553,867 B2 | 1/2017 | Kahol et al. |
| 9,560,019 B2 | 1/2017 | Barney et al. |
| 2002/0078348 A1* | 6/2002 | Leung .................. G06F 21/602 713/164 |
| 2014/0108726 A1* | 4/2014 | Laurich ................ G06F 21/602 711/114 |
| 2014/0122866 A1 | 5/2014 | Haeger et al. |
| 2015/0256609 A1* | 9/2015 | Morton ............. H04L 29/08072 715/719 |
| 2015/0358311 A1* | 12/2015 | Kancharla ............ G06F 21/335 713/156 |
| 2016/0337361 A1 | 5/2016 | Kravitz et al. |
| 2017/0177396 A1* | 6/2017 | Palermo ............. G06F 9/45558 |
| 2017/0351879 A1* | 12/2017 | Sion ..................... G06F 21/606 |

\* cited by examiner

PRIOR ART

PRIOR ART

| Wrap a virtual machine to guarantee secure input and output exchange between a client and one or more virtual CPUs. 401 |
|---|

↓

| Identify hardware resources necessary to satisfy a cryptographic demand according to cryptographic request loading. 402 |
|---|

↓

| Securely exchange crypto data and commands over a network channel service. 403 |
|---|

| Assess a latency of local hardware running on the virtual machine through a metering configuration 411 |
|---|

↓

| Estimate a processing strategy from the latency to meet a performance requirement 412 |
|---|

↓

| Adaptively switch between hardware accelerator resources and software crypto operations according to the plan to satisfy a timely crypto request 413 |
|---|

CRYPTO CLOUDLETS

CROSS REFERENCE TO RELATED APPLICATION

This application claims the priority benefit of U.S. Provisional Patent Application No. 62/428,789 entitled "Method and System for Crypto Cloudlets" filed Dec. 1, 2016, the entire contents of which are hereby incorporated by reference.

FIELD

The present invention relates to hardware and software cryptographic security devices, and more particularly, to improved performance and scaling of adaptive crypto services in the cloud and over computational environments in a secure manner.

BACKGROUND

Current cryptographic solutions include special hardware that provide enhanced security and protection. The hardware can include security measures that physically block, prevent, identify or detect intrusion. However, because the hardware is generally platform dependent, the offering of crypto services through a hardware centric platform often requires device drivers and other installed software specific to the platform in order to operate.

Figure 1A:
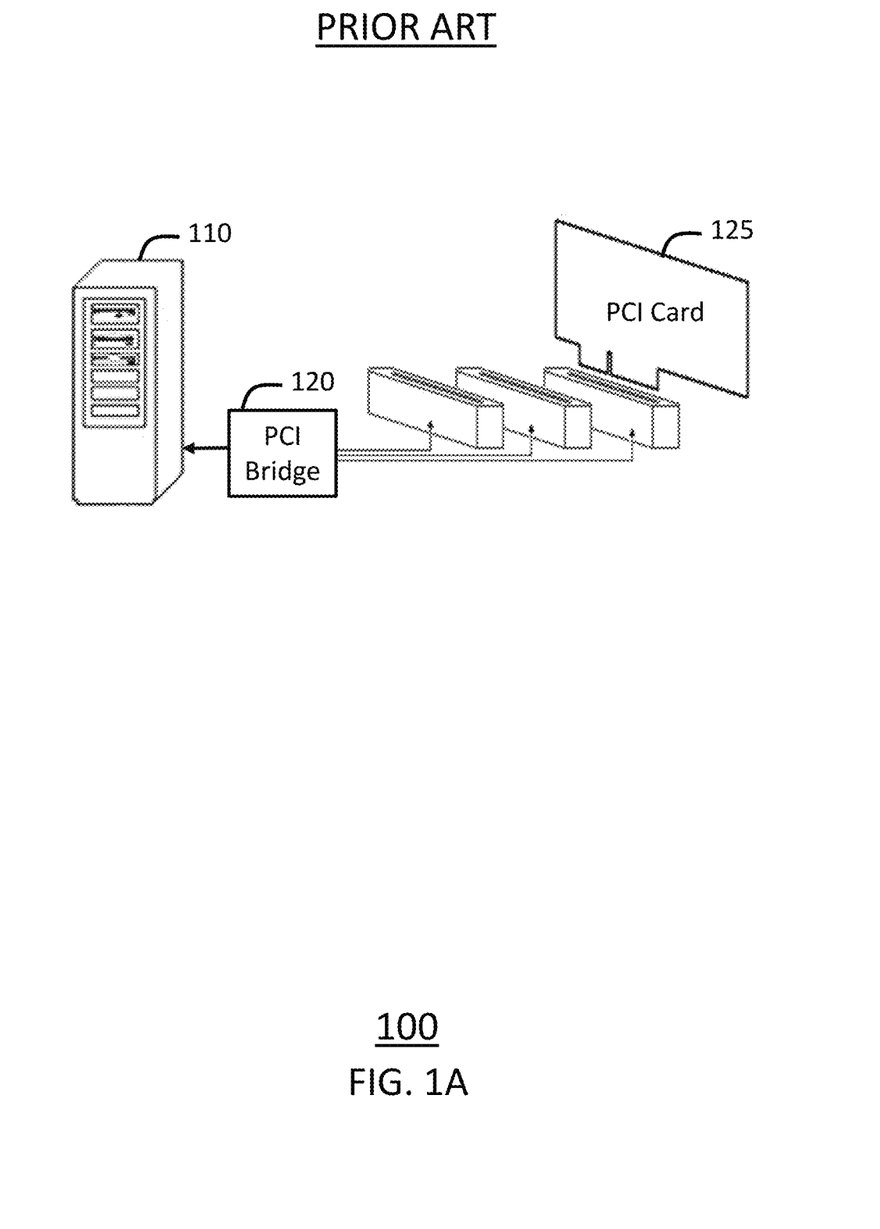
FIG. 1A illustrates a PCI system as known in the art.
Figure 1B:
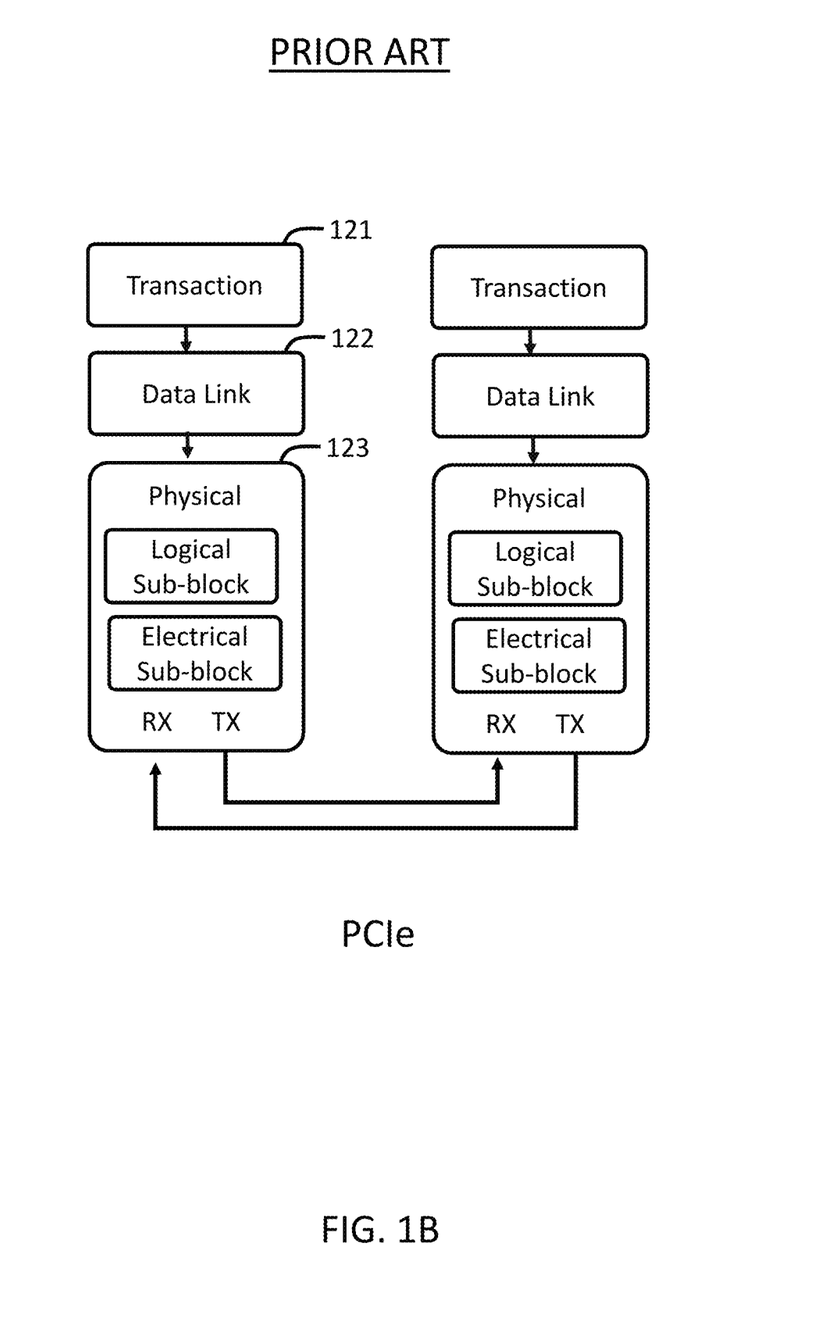
FIG. 1B illustrates a PCI interface as known in the art.

As example, FIG. 1A illustrates an existing Peripheral Interface Card (PCI) configuration. The system 100 includes a host PC 110, and a PCI Bridge 120 to communicate with a PCI card 125. FIG. 1B illustrates a PCI Express stack comprising three layers: the physical layer 123, the data link layer 122 and the transaction layer 121. The PCI bridge 120 comprises hardware and software, including device drivers specific to the host PC 110 operating system.

Different PCI device driver software must be installed for each different operating system on the host PC or other PCs. This can be burdensome when the host is required to support multiple operating systems (OS's). Updating of device drivers and installed software in the system 100 can become laborious in a scaled support environment. This places additional maintenance and support demand for deployed hardware products.

SUMMARY

Accordingly, it is desirous to identify cryptographic solutions that offer improved performance and scaling in a secure environment that depend less on specialized hardware yet achieve similar high-level security protection as that offered directly from hardware. The novel cryptographic solutions herein contemplated are disclosed in various embodiments.

In a first embodiment, a crypto cloudlet is provided that includes a security wrapper, an adaptive service and an Ethernet interface. The security wrapper enhances security of a virtual machine by guaranteeing secure Input and Output exchange between a client and identified hardware resources through a single well defined channel. The adaptive service runs within the security wrapper and identifies hardware resources necessary to satisfy cryptographic demands according to cryptographic request loading. The Ethernet interface is communicatively coupled to the security wrapper to control access to the identified hardware resources, such as CPU cores, and co-processors, cryptographic accelerators and sensors where available.

In a second embodiment, a crypto cloudlet is provided that includes a security wrapper for secure execution of crypto services with minimal specific hardware needs over a computational environment, an Ethernet interface operatively coupled to the software components within the security wrapper to communicate crypto data and commands from a client to the virtual machine through the security wrapper, and an adaptive service that runs on at least one CPU consisting of a set of dedicated software modules that support standard crypto operations. The security wrapper identifies hardware resources necessary to satisfy cryptographic demands according to cryptographic request loading, and dynamically adjusts to hardware characteristics and sensory capabilities presented by the hardware resources of the system in which it runs.

In a third embodiment, a method for cloudletting is provided that includes the steps of i) wrapping a virtual machine to guarantee secure input/output exchange between a client and one or more virtual CPUs by way of a security wrapper, ii) identifying hardware resources necessary to satisfy a cryptographic demand by way of an adaptive service running in the virtual machine, and iii) exchanging crypto data and commands over a network channel service by way of an Ethernet interface communicatively coupled to the security wrapper. The adaptive service binds the hardware resources exposed by the virtual machine to the crypto cloudlet.

BRIEF DESCRIPTION OF THE DRAWINGS

Other features of embodiments will be more readily understood from the following detailed description of specific embodiments thereof when read in conjunction with the accompanying drawings, in which.

SPECIFICATION

As discussed herein, the term crypto or cryptographic services is defined as a technology for encryption decryption, hashing, random number generation and key management, for signing or verifying data at rest, data in transit or to secure additional technologies. The term crypto cloudlet is defined as a temporarily purposed and performance centric small-scale cloud data processing center to provide powerful crypto computing services. The term cloudletting is defined as the letting of the Cloud, or computational system, assess and authorize crypto related resources thereto coupled, with oversight of commissioning such resources for crypto processing operations. The term on-cloudlet is defined as a service or crypto process that runs on the crypto cloudlet. Cryptographic systems are widely used to ensure the privacy and authenticity of data and messages communicated over unsecure channels. A privacy system prevents the extraction of information by unauthorized parties from messages transmitted over an unsecure channel, thus assuring the sender of a message that it is being read only by the intended receiver. An authentication system prevents the unauthorized injection of messages into an unsecure channel, assuring the receiver of the message of the authenticity of its sender.

Figure 2A:
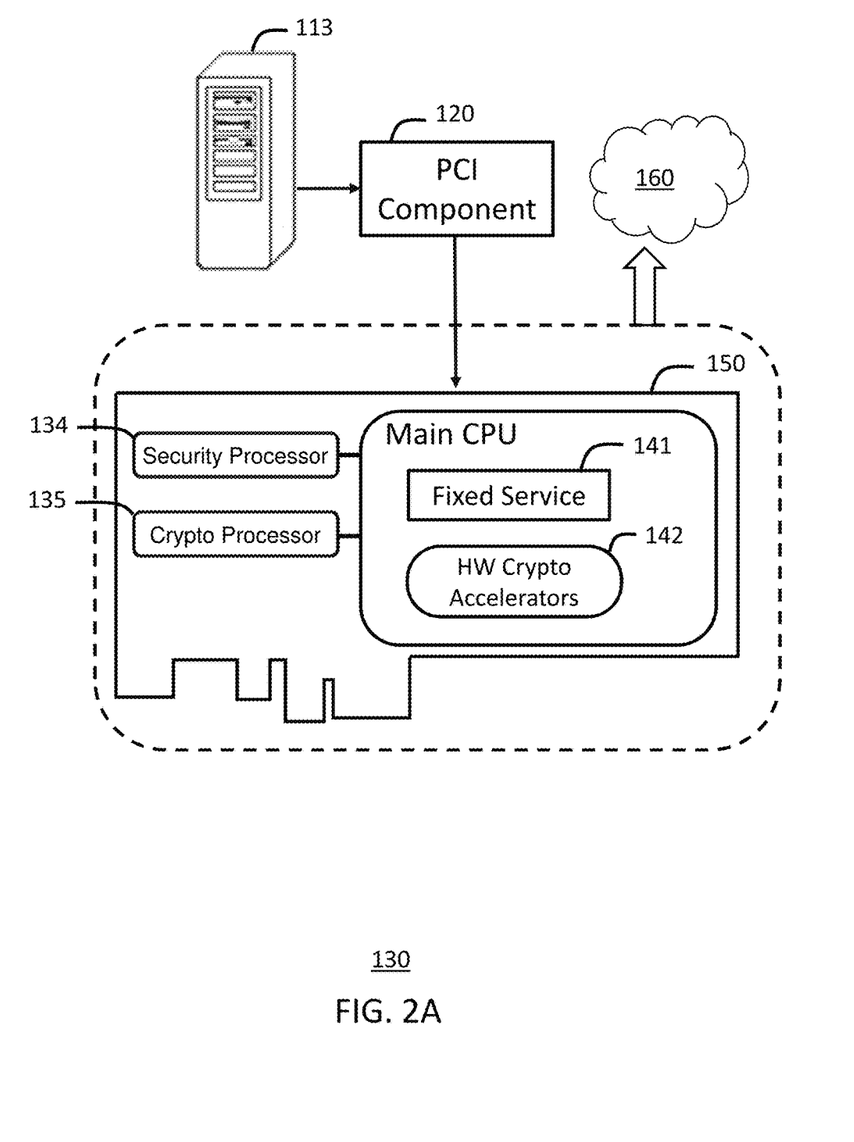
FIG. 2A illustrates a transitional configuration of a PCI card environment to a crypto cloudlet environment in accordance with one embodiment.

FIG. 2A illustrates a transitional configuration 130 from a PCI card environment 150 to a computational system environment 160 in accordance with one embodiment. It is amenable for pointing out transitional components that are refactored to minimize use of hardware resources where software resources over the cloud are available. For example, PCI component 120 is transitioned to an Ethernet connection, Fixed Service 141 is transitioned to an adaptive service, as described below, and offloading of HW crypto accelerators 142 to the Cloud as needed for satisfying crypto requests. Additional software, firmware, embedded and application code is included and disclosed herein to achieve this transition.

The PCI card 130 includes a fixed service 130 running on a main Central Processing Unit (CPU) of the card 130 and one or more hardware cryptographic accelerators. The fixed service is deemed "fixed" because the card is itself a physical piece of hardware with fixed electronic devices, such as a security processor 134, a cryptographic processor 135 and HW cryptographic accelerators 142. As an example, an operator by way of the host PC can issue crypto requests, such as key generation, to which the fixed service 141 will respond, for example, by further commands sent to the hardware crypto accelerators to service the crypto request. The computational system environment 160 is composed of a set of processing units, where each unit can be tasked with a different function. It can be as diverse as the extent of the crypto cloudlet allows, ranging from mobile devices to cloud solutions.

A brief overview of the components, as also explained ahead, are as follows:
Host Side Utilities 113: A set of libraries and utilities that present a cryptographic need or activity, or operations, such as generate a key, or set up a crypto service.
HW Crypto Accelerators 142: Transitioned to commissionable and serviceable units having optional characteristics within the computational environment. These are optional because such HW may or may not be present in the computational system or available at a particular time.
Security Wrapper (235; see FIG. 2B): The Security Wrapper creates a virtualized shell for protection of Services by breaking out from a HW acceleration based service to a SW acceleration based service.

Adaptive Services (231; see FIG. 2B): A set of dedicated software modules that support standard Crypto operations and dynamically adjust to hardware characteristics presented by the VM.
Ethernet Interface (220; see FIG. 2B): Migrated from PCI to use a network channel that adheres to TCP/IP protocol.

Figure 2B:
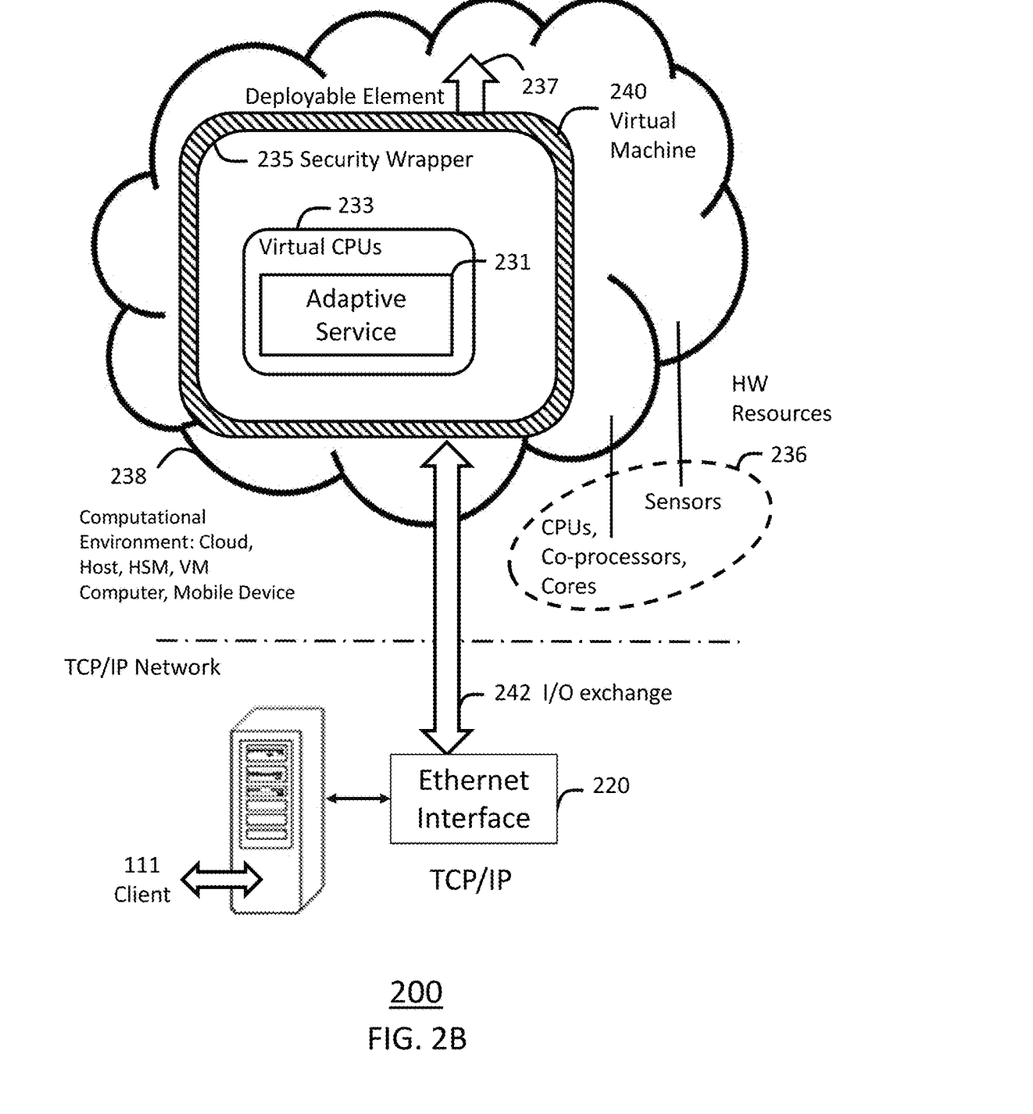
FIG. 2B illustrates a crypto cloudlet configuration suitable for use within a crypto processing environment with minimal hardware in accordance with one embodiment.

Referring now to FIG. 2B, a crypto cloudlet 200 is shown that provides crypto services with minimal specific hardware needs in a computational environment 238, including, but not limited to the Cloud. It does not require the PCI interface or fixed services previously described. The main components of the crypto cloudlet 200 include a security wrapper 235, an adaptive service 231 and an Ethernet interface 220.

The security wrapper 235 securely wraps around the virtual machine 240 to allow for secure execution of crypto services with minimal specific hardware needs over a computational system 238. It insulates a set of software components that enable a stack of crypto features to securely execute cryptographic operations within the virtual machine 240. It puts in place this set of software features and customizations and applies a 'virtual casing' of the virtual machine 240 to secure and control Input/Output in accordance with a purposed configuration of the crypto cloudlet. The security wrapper 235 includes a set of software utilities charged with identifying and binding hardware characteristics that allow it to guarantee the continuous execution of cryptographic operations by enhancing the virtualized environment in which its services run. It enforces strong data separation with the environment in which it is deployed, or host machine, by guaranteeing that unauthorized peripherals and shared buffers do not become points of entry into the virtual environment of the virtual machine 240. In addition, the security wrapper 235 guarantees that its dedicated I/O exchange interface is only accessible by an intended client and in accordance with its established security rules. The security wrapper 235 contains the needed elements to capture available sensory information, analyze it and make decisions in accordance to a preset policy. In addition, the security wrapper 235 stores entropy sources enabling the adaptive services to condition the continuance of service to the integrity of the wrapper itself.

The adaptive service 231 runs on at least one CPU consisting of a set of dedicated software modules that support standard crypto operations and identifies hardware resources necessary to satisfy cryptographic demands according to cryptographic request loading. The security wrapper 235 dynamically adjusts to hardware characteristics and sensory capabilities presented by the hardware resources 236 of the system in which it runs. The adaptive service 231 includes a set of software utilities charged with identifying hardware characteristics that will allow it to optimize the satisfaction of cryptographic requests. It operates with a greedy strategy, choosing the fastest, available resource to operate on a specific request type in a first in first out basis. As one example, when demand is high, and crypto requests are queuing up, it estimates the fastest path, and decides on the optimal way of proceeding with calculations provided the characteristics of the hardware are available. As another example, the adaptive service 231 can add global optimizations such as genetic algorithms to supplement the greedy strategy, for instance, by way of differentiated services based on user level: High, Med, Low.

The Ethernet interface 220 is operatively coupled to the software components of the Security Wrapper 235 to communicate (transmit and receive) crypto data and commands from a client 111 to the virtual machine 240 through the security wrapper 235. The Ethernet interface is complemented by an enhanced driver with monitoring and metering capabilities dedicated to the service of cryptographic requests in compliance with the security wrapper's service policies.

The crypto cloudlet also includes a deployable element 237 that installs itself (i.e., the crypto cloudlet 200), thereby establishing a unique configuration for the security wrapper 235 and the adaptive services 231, where the unique configuration recognizes the identified hardware resources 236. Notably, the physical protection of the security wrapper 235 is directly proportional to the computational environment in which it is deployed. The security wrapper 235 also safeguards and manages digital keys for strong authentication while enabling the adaptive service 231 for complete asymmetric and symmetric cryptography operations. In such capacity, the deployable element operates to secure one or more of:

(a) on-cloudlet secure cryptographic key generation;
(b) on-cloudlet secure cryptographic key storage and management;
(c) on-cloudlet use of cryptographic and sensitive data material;
(d) on-cloudlet offloading application servers for complete asymmetric and symmetric cryptography; and
(e) on-cloudlet management of Transparent Data Encryption keys for databases.

This allows for the deploying of crypto services anywhere the service code can be cross compiled. One benefit is that the deployment does not need PCI specific drivers for each operating system (e.g., UNIX, Windows, OSX, Linux, AIX, etc.).

Briefly, the computational environment 238 includes a set of hardware components consisting of a stack of crypto features. However, it is the security wrapper 235 that sources and enables the secure execution of the accelerated cryptographic operations exposed by the hardware components. In this manner, the security wrapper 235 limits secure Input/Output exchanges allowing only those exchanges the crypto cloudlet was created for through the single well defined channel 242. The computational environment 238 also presents sensory capabilities, for example, sensor data captured from other sources (e.g., temperature, acceleration, etc.) but it is the security wrapper 235 that enables the detection of tampering events exposed by the sensory capabilities. The sensors provide ability to measure temperature, acceleration, tamper, and other electronic metrics. For example, the sensor wrapper 235 can detect elevation of temperature due to heating of the CPUs, for example, responsive to security attacks or increased demand loads. If can detect and report abrupt or unexpected physical movements, for example, opening of a lid.

In another specialized arrangement, the crypto cloudlet 200 can be configured for use with a Hardware Security Module (HSM) that includes active tampering features on which the security wrapper and adaptive services run. This can be considered a "Virtual Security Module" (VSM) that runs in the computational environment 238 and references a set of crypto software features and customizations therewith provided and applied to a secure virtual casting of the virtual machine 240 to secure and control input and output as intended by design conforming the crypto cloudlet. Although not shown, the crypto cloudlet can further include a Hardware Security Module (HSM) on which the security wrapper 235 and the adaptive services run 231, where the security wrapper 235 includes active tampering features.

Figure 3A:
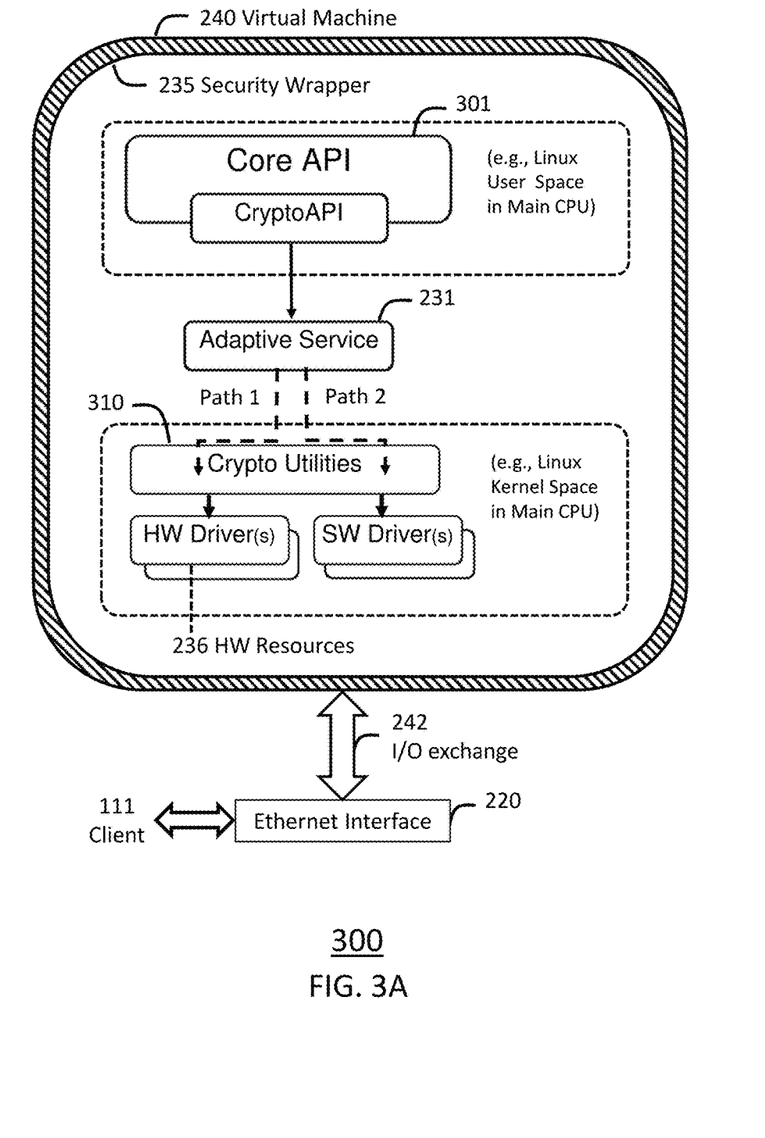
FIG. 3A illustrates a crypto cloudlet configuration for a high-level decision path of the crypto cloudlet for balancing crypto latency performance, security and scalability in accordance with some embodiments.

FIG. 3A illustrates a crypto cloudlet configuration 300 of a high-level decision path of the adaptive service 231 module in accordance with one embodiment. The configuration 300 provides for balancing crypto latency performance, security and scalability against available software or hardware acceleration resources. Recall, the security wrapper 235 enhances security of the virtual machine 240 by guaranteeing secure Input/Output exchange between the client 111 and identified hardware resources 236 through a single well defined channel 242. The adaptive service 231 runs within the security wrapper 235 and identifies hardware resources 236 necessary to satisfy cryptographic demands according to cryptographic request loading. The Ethernet interface 220 is communicatively coupled to the security wrapper 235 and interfaces to the adaptive service 231 to control access to the identified hardware resources 236. The hardware resources 236 includes at least one CPU and when available, at least one among co-processors, cryptographic accelerators and sensors.

Within the configuration 300, the adaptive service 231 selects between multiple decision paths. Here, it selects between two (2) paths as shown; though other decision paths are contemplated and can be similarly supported. It can select between PATH 1 for hardware accelerated crypto operations exposed through hardware resources 236 made available through the virtual machine 240, and PATH 2 for software supported crypto operations available within the crypto cloudlet itself. It does this by expanding crypto utilities 310 according to a configuration between the virtual machine 240 and its hardware resources 236. The crypto operations are offloaded to specialized hardware or computed using standard central processing units.

The adaptive service 231 supports resource-intensive and interactive client applications by providing powerful computing resources to the client 111 with lower latency through adaptation of selecting hardware accelerators available on the hardware resources 236. The adaptive services 231 runs a software Applications Programming Interface (API) 301 available in the crypto cloudlet itself. The client 111 can be at least one among a computational device, a mobile device, another cloud, or TCP/IP enabled device. The adaptive service 231 assesses a latency of the identified hardware resources 236 running on the virtual machine 240, estimates a processing performance required to meet a latency requirement, and adaptively switches between hardware accelerated and software based cryptographic operations to satisfy a timely cryptographic request from a host. In such regard, the adaptive service (e.g., PATH 1 or PATH 2) thereby decouples hardware dependencies, including one among a security processor and one or more hardware accelerators. It also decouples corresponding hardware drivers, which are replaced by an equivalent software solution in a corresponding architecture within the computational environment 238 (see FIG. 2A).

The crypto cloudlet configuration 300 is thus effectively powered by a security enhanced virtual machine that limits the Input/Output exchanges 242 allowing only those they are created for, providing logical protection, including cryptographic keys, from non-authorized elements. This permits the cryptographic cloudlet to conform to one or more of the following characteristics.

(a) strong isolation between untrusted user-level computations;
(b) mechanisms for authentication, access control, and metering;
(c) dynamic resource allocation for user-level computations; and (d) system adaptability to workload changes so that availability matches demand at all times.

Figure 3B:
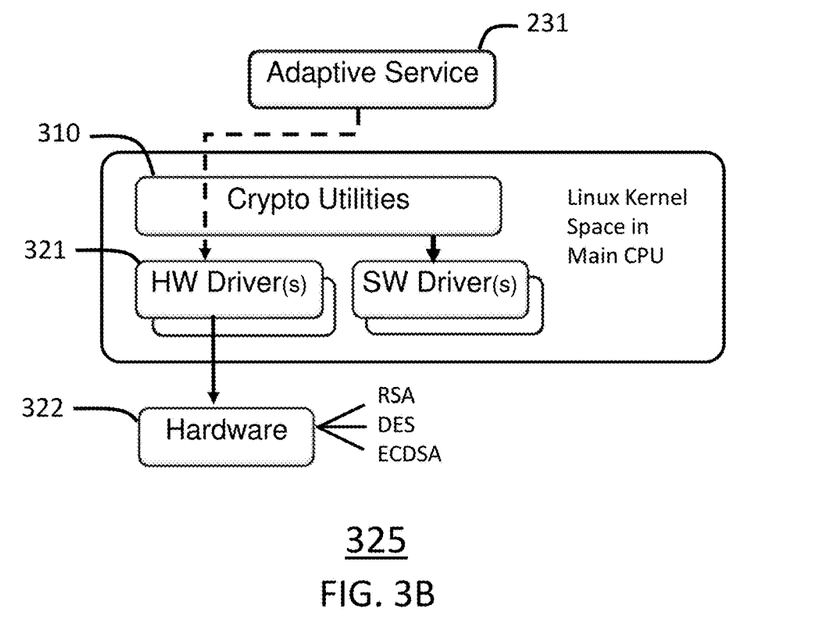
FIG. 3B illustrates a lower level decision path of FIG. 3A where the adaptive service module enables the secure execution of accelerated cryptographic operations exposed by the hardware components in accordance with one embodiment.

FIG. 3B illustrates a lower level decision path of FIG. 3A where the adaptive service 231 module enables the secure execution of accelerated cryptographic operations exposed by the hardware components 322. It leverages the crypto utilities 310 by means of the hardware (HW) Drivers 321 to identify and make use of the hardware characteristics that allow it to optimize the satisfaction of cryptographic requests. Recall, the adaptive service 231 module operates with a greedy strategy, choosing the fastest, available resource (e.g., co-processor, crypto-accelerator, CPU cores, etc.) to operate on a specific request type in a first in first out basis. However, when demand is high, and requests are queuing up, it estimates the fastest path, provided the characteristics of the hardware are available and therefore deciding on the optimal way of proceeding with calculations.

Figure 3C:
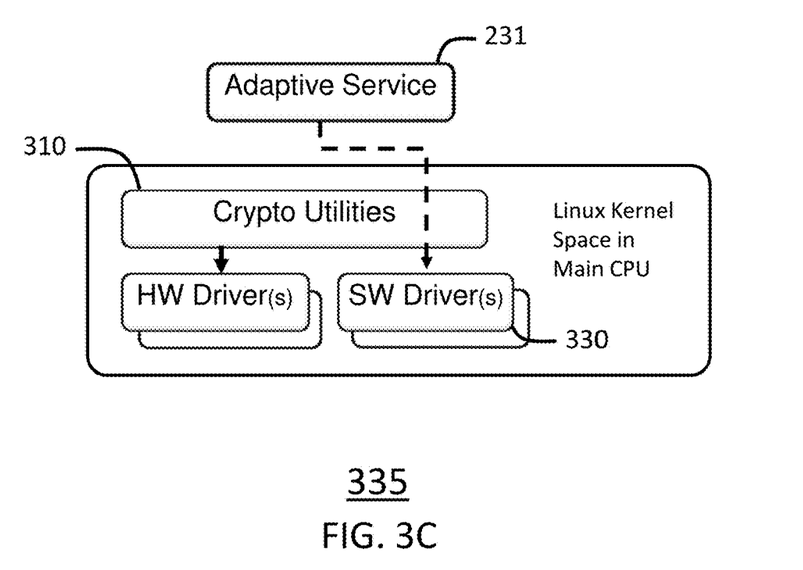
FIG. 3C illustrates a lower level decision path of FIG. 3A where the adaptive service module enables the secure execution of accelerated cryptographic operations exposed by the software components in accordance with one embodiment.

FIG. 3C illustrates a lower level decision path of FIG. 3A where the adaptive service 231 module enables the secure execution of accelerated cryptographic operations exposed by the software components. It leverages the crypto utilities 310 by means of the software (SW) Drivers 330 to identify and make use of the software libraries that will allow it to optimize the satisfaction of cryptographic requests. When hardware resources are unavailable, due to computational environment configuration or request load, the software Driver 330 presents an alternate way of providing the satisfaction of cryptographic requests through software (e.g., cryptographic libraries). By way of the SW drivers 330, the software execution path can be subjected to parallelization when multiple cores are available for processing.

Figure 4A:
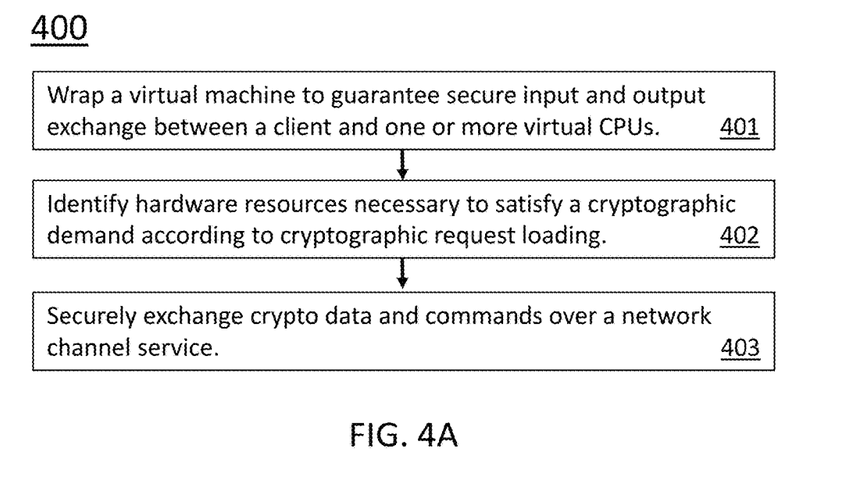
FIG. 4A depicts a method for the secure execution of accelerated cryptographic operations by way of a crypto cloudlet in accordance with one embodiment.

FIG. 4A depicts a method 400 for the secure execution of accelerated cryptographic operations by way of a crypto cloudlet in accordance with one embodiment. When describing the method 400, reference will be made to components of FIGS. 2A, 2B and 3A although the it can be practiced in any other suitable system or device. Moreover, the steps of the method 400 are not limited to the particular order in which they are presented in FIG. 4. The inventive method can also have a greater number of steps or a fewer number of steps than those shown in FIG. 4.

Beginning at step 401, the security wrapper 231 wraps the virtual machine 240 to guarantee secure input/output exchange between a client 111 and one or more virtual CPUs. It limits secure input/output exchanges allowing only those exchanges for which the crypto cloudlet was created. It does this by first identifying sensory capabilities, for example, tamper detection from non-authorized elements, and then binding them to take advantage of the information it captured and according to its vulnerability policy. This policy is part of the configuration of the crypto cloudlet, for example, one that is either dynamically generated or configured by the deployable element 237 on installation. In addition, the security wrapper 231 minimizes possible surface attacks by reducing their exposure (e.g., shared buffers between host and virtual machine).

At step 402, the adaptive service 231 identifies hardware resources necessary to satisfy a cryptographic demand running in the virtual machine 240. It does this by inquiring the virtual machine 240 for resource availability and comparing it with the unique configuration file it generated during the deployment of the crypto-cloudlet. The security wrapper 231 binds the adaptive services to one or more hardware accelerators exposed by the virtual machine. It extracts and abstracts the service logic out of the hardware shell to be completely self-sufficient software based.

At step 403, the Ethernet interface 220 exchanges crypto data and commands over a network channel service. The adaptive service 231 provides the network channel services for exchange of crypto data and commands by way of the Ethernet interface communicatively coupled to the security wrapper. The Ethernet interface 220 further includes a driver enhancement that can monitor traffic for security compliance which can be installed on the virtual machine 240.

Figure 4B:
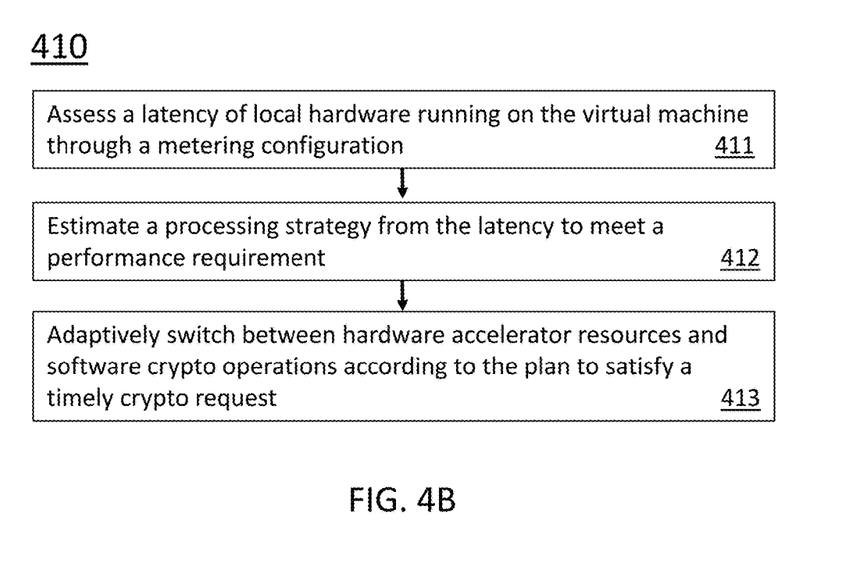
FIG. 4B depicts a method for optimizing resource utilization in accordance with one embodiment.

FIG. 4B depicts a method 400 for optimizing resource utilization by way of the adaptive service 231 in accordance with one embodiment. At step 411, the adaptive service 231 assesses a latency of local hardware running on the virtual machine through a metering configuration. In view of its generated metering (which is part of its unique configuration) the adaptive service module 231 examines and records the reported characteristics of the hardware, for example, the number of crypto-operations reported for a certain interval of time (e.g., 1 RSA crypto requests per millisecond on a crypto-chip; processing speed, loading, performance). At step 412 the adaptive service 231 estimates a processing strategy from the latency metric to meet the performance requirement. In particular, it examines the generated configuration file to recognize the hardware characteristics exposed via the virtual machine 240. It can then adaptively switch between hardware accelerator resources and software crypto operations at step 413 to satisfy a timely crypto request from a host, for example, as illustrated in FIGS. 3B and 3C.

Figure 5:
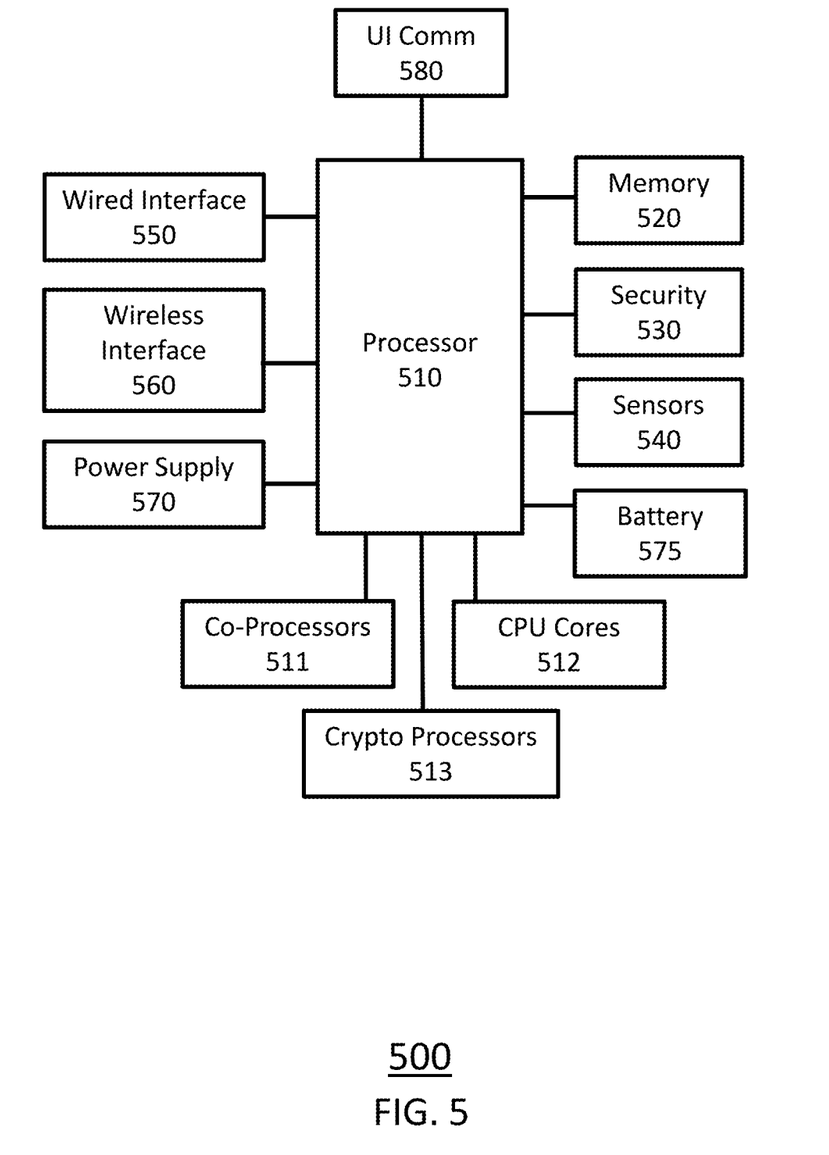
FIG. 5 illustrates a hardware platform suitable for use within a crypto processing environment of the crypto cloudlet configuration in accordance with one embodiments.

FIG. 5 illustrates a hardware platform 500 suitable for use as, or within, a crypto processing environment providing the crypto cloudlet configuration in accordance with one embodiment. The platform 500 includes a processor 510, a memory 520, and a security 530, sensors 240, a wired interface 550, a wireless interface 560, a power supply 570 and a battery 575. These components may be communicatively coupled as shown or by direct hardware interfaces there between, including, but not limited to electronics, circuits, wires, lines, logic, or gates, where suitable.

The processor 510 may include one or more data processing circuits, such as a general purpose and/or special purpose processor, such as a microprocessor and/or digital signal processor (e.g., GPU, µP, ASIC, DSP, CPLD, IC, etc.). The processor 510 is configured to execute computer program code in the memory 520, described below as a non-transitory computer readable medium, to perform at least some of the operations described herein as being performed by an identified component, module or software block. The computer program code can include computer instructions, assembly code, firmware, or embedded code, machine code, that when executed by the processor 510 causes the processor 510 to perform operations in accordance with one or more embodiments disclosed herein.

Specific examples (a non-exhaustive list) of the computer readable storage medium exemplified by memory 520 can include the following: a hard disk, a random access memory (RAM), a read-only memory (ROM), an erasable programmable read-only memory (EPROM), Flash memory (NAND, NOR), a solid state device (SSD), an appropriate optical fiber (FICON) with a repeater, an optical storage device, a magnetic storage device, or any suitable combination of the foregoing.

The processor 510 may also be communicatively attached to a co-processor 511 (on-board or off board), one or more CPU cores 512 and one or more crypto processors 513 (e.g., HW crypto accelerator) that assist in off-loading computational or processing tasks.

The sensors 540 can detect or measure a physical property and record, indicate, or otherwise responds to the sensory information. The sensors 540 provide for measurement of temperature, humidity, radio frequency, electromagnetic, light, force, pressure, acceleration, movement, position, tilt, and other physical interaction and environmental conditions. The Sensors 540 may further include a signal comparator, a phase comparator, an analog to digital converter, amplifier, signal filter, etc. used to enable the processor 510 to receive and process signals from one or more sensors.

The security module 530 provides for monitoring of security violations, security risks, unauthorized uses and attacks on the platform 500. It may be a mixed signal low-power microcontroller that include decision logic, memory or software and that communicatively couples to the sensors 540 and the processor 510. The security module 530 may include software and logic, or share resources and responsibilities with the processor 510, to detect security events, such as tamper levels, thresholds, and conditions.

The platform 500 may include a wired network communication interface 550 and/or a wireless interface 560, for example, a radio access communication transceiver. The wired network interface can include standard computer networking interfaces used in local area networks (LAN), wide area networks (WAN), over the Cloud, and the Internet and other frame based or packed based networks. The Ethernet interface can use TCP/IP and UDP protocols for 10/100/1000 Mbps transmission over standard Cat 5, Cat 5e, or Cat 6 cables. The radio access communication transceiver can include, but is not limited to, a LTE or other cellular transceiver, WLAN transceiver (IEEE 802.11), WiMAX transceiver, Bluetooth transceiver, NFC transceiver, Radio Frequency Identification (RFID) or other radio communication transceiver configured to communicate directly or indirectly (e.g., via a radio access node) with a network node.

The platform 500 may include User Interface (UI) communication (COMM) modules 580, for example, electronic data exchange or generic communication, such as Universal Serial Bus (USB), RS-232 serial port, smart card reader, Graphical User Interfaces (GUI), Light Emitting Diodes (LED), or other user related I/O interfaces.

The power supply 570 provides power to the electronic components of platform 500 and can include regulators and converters to provide required voltage and current requirements. The battery 575 can also provide power, for example, in low-power modes or when otherwise required for security reasons.

Further Definitions and Embodiments

In the above-description of various embodiments of the present disclosure, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented in entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Scheme, Go, C++, C#, VB.NET, Python or the like, conventional procedural programming languages, such as the "C" programming language, Perl, PHP, dynamic programming languages such as Python, Ruby and Groovy, or other programming languages. The program code may execute entirely on the user's computer, partly on the user's computer, as a stand-alone software package, partly on the user's computer and partly on a remote computer, entirely on the remote computer or server, or within the Cloud or other computer network. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS), Backend as a Service (BaaS) for connecting mobile apps to cloud based services, and Security as a Service (SECaas).

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

It is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed, is:

1. A computer program product comprising a non-transitory computer readable medium storing program code to be executed by at least one computer processing unit (CPU) in a computational environment, whereby execution of the program code causes the at least one CPU to execute a crypto cloudlet by performing operations comprising:
    securing execution of crypto services in the computational environment via a security wrapper shell of the crypto cloudlet, the security wrapper shell including a set of components configured to enable crypto features to securely execute cryptographic operations within a virtual machine;
    providing, via at least the security wrapper shell, a secure input/output exchange between a client and the virtual machine by limiting input/output through the secure input/output exchange to input/outputs to which the crypto cloudlet was created;
    dynamically adjusting, via at least the security wrapper shell, access control to hardware resources running on the virtual machine;
    communicating crypto data and commands from the client to the virtual machine through the security wrapper shell via an interface coupled to components in the set of components; and
    executing an adaptive service of the crypto cloudlet, the adaptive service comprising a set of modules configured to support crypto operations and identify hardware resources required to satisfy cryptographic demands according to cryptographic request loading, wherein the adaptive service is configured to:
        assess a latency of the hardware resources running on the virtual machine based on performance of the hardware resources over a period of time;
        estimate a processing performance required to meet a latency requirement; and
        adaptively switch between hardware accelerated cryptographic operations and software based cryptographic operations to satisfy a timely cryptographic request from a host based on the processing performance required.

2. The computer program product of claim 1 wherein the non-transitory computer readable medium includes further program code that when executed by the at least one CPU causes the at least one CPU to perform operations comprising:
    providing, via at least the security wrapper shell, the secure Input/Output exchange between the client and the hardware resources identified through a single defined channel; and
    controlling access to the hardware resources identified via at least the interface,
    where the hardware resources required to satisfy the cryptographic demands include the at least one CPU and when available: co-processors, cryptographic accelerators and sensors.

3. The computer program product of claim 2, wherein the non-transitory computer readable medium includes further program code that when executed by the at least one CPU causes the at least one CPU to perform operations comprising:
  limiting, via at least the security wrapper shell, secure Input/Output exchanges only those exchanges for which the crypto cloudlet was created, and
  providing, via at least the security wrapper shell, tampering protection from non-authorized elements.

4. The computer program product of claim 2, the non-transitory computer readable medium includes further program code that when executed by the at least one CPU causes the at least one CPU to perform operations comprising:
  supporting resource-intensive and interactive client applications by providing computer resources to the client with lower latency through adaptation of selecting hardware accelerators available on the hardware resources,
  providing a fixed service through a software Applications Programming Interface (API) available in the crypto cloudlet, and
  wherein the client is at least one of: a computational device, a mobile device, or a Transmission Control Protocol/Internet Protocol (TCP/IP) enabled device.

5. The computer program product of claim 4, where the fixed service is configured to:
  decouple hardware dependencies including one among a security processor and one or more hardware accelerators, and
  decouple corresponding hardware drivers replaced by an equivalent software solution in a corresponding architecture within the computational environment.

6. The computer program product of claim 4, wherein the non-transitory computer readable medium includes further program code that when executed by the at least one CPU causes the at least one CPU to perform operations comprising at least one of the following operations:
  providing isolation between untrusted user-level computations;
  performing mechanisms for authentication, access control, and metering;
  performing dynamic resource allocation for user-level computations; and
  performing adaptation of resource utilized for system operation responsive to workload demand changes.

7. The computer program product of claim 2, wherein the non-transitory computer readable medium includes further program code that when executed by the at least one CPU causes the at least one CPU to perform operations comprising:
  executing a deployable element that installs the security wrapper shell and establishes a configuration for the security wrapper shell and the adaptive service to recognize the hardware resources identified,
  where physical protection of the security wrapper shell is directly proportional to a cloud computing environment in which the security wrapper shell is deployed.

8. The computer program product of claim 7, where the deployable element operates to secure at least one of:
  an on-cloudlet secure cryptographic key generation;
  an on-cloudlet secure cryptographic key storage and management;
  an on-cloudlet use of cryptographic and sensitive data material;
  an on-cloudlet offloading application servers for complete asymmetric and symmetric cryptography; and
  an on-cloudlet management of Transparent Data Encryption keys for databases.

9. The computer program product of claim 1, wherein the non-transitory computer readable medium includes further program code that when executed by the at least one CPU causes the at least one CPU to perform operations comprising:
  enabling, via at least the security wrapper shell, secure execution of accelerated cryptographic operations provided by a set of hardware components in the computational environment.

10. The computer program product of claim 1, wherein the non-transitory computer readable medium includes further program code that when executed by the at least one CPU causes the at least one CPU to perform operations comprising: enabling, via at least the security wrapper shell, detection of an abnormal event exposed by at least one of a set of sensors in the computational environment, the abnormal event including a tampering event.

11. The computer program product of claim 1, wherein the adaptive service selects between one of:
  software supported crypto operations available within the crypto cloudlet; and
  hardware accelerated crypto operations exposed through hardware resources provided via the virtual machine.

12. The computer program product of claim 1, wherein the adaptive service is further configured to expand crypto utilities in accordance with a configuration between the virtual machine and hardware resources of the virtual machine.

13. The computer program product of claim 1 wherein the at least one CPU performs the operations in a Virtual Security Module (VSM) running on the computational environment, the VSM configured to reference a set of crypto software features and customizations and apply the set of crypto software features and customizations to the virtual machine to secure and control input and output of the virtual machine.

14. A method by a hardware server for executing a crypto cloudlet, the method comprising:
  wrapping a virtual machine to guarantee secure input/output exchange between a client and one or more virtual computer processing units (CPUS) via a security wrapper shell;
  identifying hardware resources necessary to satisfy a cryptographic demand via an adaptive service running in the virtual machine;
  dynamically adjusting, via at least the security wrapper shell, access control to hardware resources running on the virtual machine;
  exchanging crypto data and commands over a network channel service via an interface communicatively coupled to the security wrapper shell;
  identifying hardware resources required to satisfy cryptographic demand according to cryptographic request loading;
  assessing a latency of hardware resources running on the virtual machine based on performance of the hardware resources over a period of time;
  estimating a processing performance required to meet a latency requirement; and
  adaptively switching between hardware accelerated cryptographic operations and software based cryptographic operations to satisfy a timely cryptographic request from a host based on the processing performance required, wherein the adaptive service binds the hardware resources exposed by the virtual machine to the crypto cloudlet.

15. The method of claim 14, further comprising:
limiting secure Input/Output exchanges allowing only those exchanges for which the crypto cloudlet was created, and
providing tampering protection from non-authorized elements.

16. The method of claim 14, further comprising:
installing the security wrapper shell of the crypto cloudlet and establishing a configuration for the security wrapper shell and the adaptive service of the crypto cloudlet to recognize the hardware resources identified,
wherein the installing of the security wrapper shell secures at least one of:
an on-cloudlet secure cryptographic key generation;
an on-cloudlet secure cryptographic key storage and management;
an on-cloudlet use of cryptographic and sensitive data material;
an on-cloudlet offloading application servers for complete asymmetric and symmetric cryptography; and
an on-cloudlet management of Transparent Data Encryption keys for databases.

17. A computer program product comprising a non-transitory computer readable medium storing program code to be executed by at least one computer processing unit (CPU) in a computational environment, whereby execution of the program code causes the at least one CPU to execute a crypto cloudlet by performing operations comprising:
securing execution of crypto services in the computational environment via a security wrapper shell of the crypto cloudlet, the security wrapper shell including a set of components configured to enable crypto features to securely execute cryptographic operations within a virtual machine;
providing, via at least the security wrapper shell, a secure input/output exchange between a client and the virtual machine by limiting input/output through the secure input/output exchange to input/outputs to which the crypto cloudlet was created;
dynamically adjusting, via at least the security wrapper shell, hardware resources including CPU cores, co-processors, cryptographic accelerators and sensors available to the virtual machine to optimize execution of said cryptographic operations; and
executing an adaptive service of the crypto cloudlet, the adaptive service comprising a set of modules configured to identify and meter characteristics of said hardware resources, and enable said characteristics in the crypto cloudlet as said crypto features, said characteristics including one or more of crypto processing speed, performance, scalability and loading on said hardware resources to optimize said execution in said virtual machine,
where said set of modules are configured to support said cryptographic operations to satisfy cryptographic demands of the client by:
assessing a latency of the hardware resources running on the virtual machine based on performance of the hardware resources over a period of time;
estimating a processing performance required to meet a latency requirement; and
adaptively switching between hardware accelerated cryptographic operations and software based cryptographic operations to satisfy a timely cryptographic request from the client based on the processing performance required.

* * * * *